United States Patent
Saito

(10) Patent No.: US 8,539,215 B2
(45) Date of Patent: Sep. 17, 2013

(54) PROTOCOL CONVERTER FOR PERFORMING PROTOCOL CONVERSION BETWEEN LOADING AN OS IMAGE USING A FIRST PROTOCOL IN COMMUNICATION WITH A REMOTE DISK DRIVE AND SECOND PROTOCOL TO BE USED TO LOAD BOOT LOADER IN COMMUNICATION WITH A MEMORY

(75) Inventor: Shinsuke Saito, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 391 days.

(21) Appl. No.: 12/988,187

(22) PCT Filed: May 13, 2009

(86) PCT No.: PCT/JP2009/058907
§ 371 (c)(1),
(2), (4) Date: Oct. 15, 2010

(87) PCT Pub. No.: WO2009/139408
PCT Pub. Date: Nov. 19, 2009

(65) Prior Publication Data
US 2011/0055542 A1 Mar. 3, 2011

(30) Foreign Application Priority Data
May 13, 2008 (JP) .................................. 2008-126096

(51) Int. Cl.
*G06F 9/00* (2006.01)
(52) U.S. Cl.
USPC .................................................. 713/2; 713/1

(58) Field of Classification Search
USPC ......................................................... 713/1, 2
See application file for complete search history.

(56) References Cited

U.S. PATENT DOCUMENTS

| | | | |
|---|---|---|---|
| 7,418,588 B2 * | 8/2008 | Lin et al. ............................ | 713/2 |
| 2005/0144431 A1 | 6/2005 | Lin et al. | |
| 2006/0206699 A1 | 9/2006 | Yokota et al. | |

FOREIGN PATENT DOCUMENTS

| | | |
|---|---|---|
| JP | 2006 252168 | 9/2006 |
| JP | 4013980 | 11/2007 |

OTHER PUBLICATIONS

International Search Report issued Jul. 28, 2009 in PCT/JP09/058907 filed May 13, 2009.
Akutsu, Y., "Speed Up Technique by Hardware Enhancement", vol. 5 No. 2, pp. 56-63, Windows Start, (Dec. 29, 1999) (with partial English translation).

* cited by examiner

*Primary Examiner* — Thomas Lee
*Assistant Examiner* — Aurel Prifti
(74) *Attorney, Agent, or Firm* — Oblon, Spivak, McClelland, Maier & Neustadt, L.L.P.

(57) ABSTRACT

A protocol converter includes a MBR emulation unit connectable to a connector for an internal hard disk drive and configured to provide MBR in response to a request from a system BIOS, a first interface configured to acquire an OS from a remote hard disk drive through a network in response to an OS acquisition request from a secondary boot loader, a second interface configured to provide the secondary boot loader with the OS acquired by the first interface, and a conversion unit configured to perform conversion between a first protocol to be used by the first interface and a second protocol to be used by the second interface.

2 Claims, 4 Drawing Sheets

PROTOCOL CONVERTER FOR PERFORMING PROTOCOL CONVERSION BETWEEN LOADING AN OS IMAGE USING A FIRST PROTOCOL IN COMMUNICATION WITH A REMOTE DISK DRIVE AND SECOND PROTOCOL TO BE USED TO LOAD BOOT LOADER IN COMMUNICATION WITH A MEMORY

BACKGROUND OF THE INVENTION

1. Field of the Invention

The present invention relates to a method for activating an OS in a computer system provided with a CPU and a memory, and to a protocol converter connectable to a hard disk drive connector in a computer system provided with a CPU and a memory.

2. Background Description of Related Art

There has heretofore been known a "thin client system" having a system architecture in which a client terminal (a computer system) used by a user performs minimum necessary processing while a server apparatus centrally performs most of the processing (Patent Document 1, for example).

The client terminal (the computer system) used in this thin client system is not equipped with a storage device such as a hard disk drive, and is called a "thin client terminal".

Patent literature 1: JP-B No. 4013980

SUMMARY OF INVENTION

However, there has been a problem that the conventional thin client terminal has to use at least one universal bus slot (such as a PCI bus slot) in order to construct a network booting structure.

Specifically, there has been a problem that, when the network booting structure is constructed, the conventional thin client terminal consumes the PCI bus slot or the like for inserting a network card or the like compatible with PXE (Preboot eXecution Environment).

Alternatively, there has been a problem that a dedicated system must be used to construct the conventional thin client system.

The present invention has therefore been made in view of the foregoing problems, and an object thereof is to provide a method for activating an OS and a protocol converter, which are capable of constructing a network booting structure by use of a universal PC (personal computer) and a server, without consuming one universal bus slot such as a PCI bus slot.

A first aspect of the present invention is summarized as a method for activating an OS in a computer system provided with a CPU and a memory, comprising the steps of: executing, at the CPU, a system BIOS when power is turned on; selecting, at the system BIOS, an internal hard disk drive as initial program load equipment; acquiring, at the system BIOS, a master boot record from a protocol converter connected to a connector for the internal hard disk drive; causing the system BIOS to read a boot loader into the memory and to execute the boot loader based on the master boot record; causing the boot loader to read a secondary boot loader into the memory and to execute the secondary boot loader; transmitting, from the second boot loader to the protocol converter, an OS acquisition request; causing the protocol converter to acquire an OS from a remote hard disk drive through a network based on the received OS acquisition request and to provide the secondary boot loader with the OS; and causing the secondary boot loader to read the OS provided by the protocol converter into the memory and to execute the OS.

In the first aspect, the method may further comprise the step of performing, at the protocol converter, protocol conversion between a first protocol to be used for communication with the remote hard disk drive and a second protocol to be used for communication with the connector for the internal hard disk drive. Here, the first protocol is an iSCSI protocol, for example. The second protocol is a serial ATA protocol, for example.

A second aspect of the present invention is summarized as a protocol converter to be used in a computer system provided with a CPU and a memory, the protocol converter comprising: a MBR emulation unit configured to provide a master boot record in response to a request from a system BIOS; a first interface configured to acquire an OS from a remote hard disk drive through a network in response to an OS acquisition request from a secondary boot loader; a second interface being connectable to a connector for an internal hard disk drive in the computer system and configured to provide the secondary boot loader with the OS acquired by the first interface; and a conversion unit configured to perform conversion between a first protocol to be used by the first interface and a second protocol to be used by the second interface.

In the second aspect, the first protocol may be an iSCSI protocol. In the second aspect, the second protocol may be a serial ATA protocol.

As described above, according to the present invention, it is possible to provide a method for activating an OS and a protocol converter, which are capable of constructing a network booting structure by use of a universal PC (personal computer) and a server, without consuming one universal bus slot such as a PCI bus slot.

DESCRIPTION OF EMBODIMENTS (Protocol Converter according to First Embodiment of Present Invention)

A protocol converter 1 according to a first embodiment of the present invention will be described with reference to FIG. 1 and FIG. 2.

Figure 1:
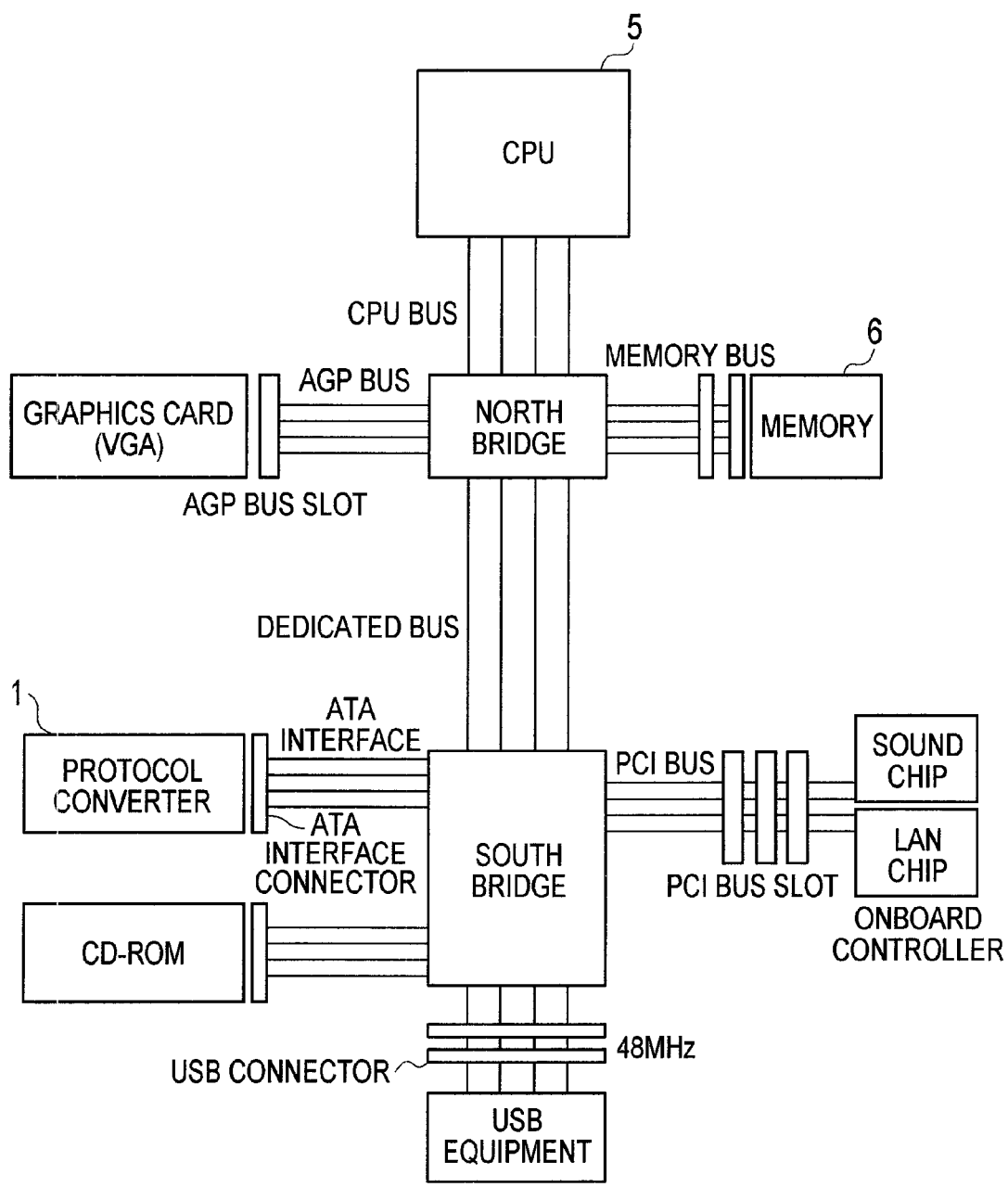
FIG. 1 is a configuration diagram of a computer system equipped with a protocol converter according to a first embodiment of the present invention.

FIG. 1 shows a configuration of a computer system equipped with the protocol converter 1 according to the first embodiment of the present invention.

As shown in FIG. 1, the protocol converter 1 according to this embodiment is configured to establish connection to an ATA (AT Attachment) interface connector (an internal hard disk drive connector) in a computer system provided with a CPU 5 and a memory 6.

Here, the protocol converter 1 according to this embodiment may also be configured to establish connection to a USB (universal serial bus) connector in the computer system.

Figure 2:
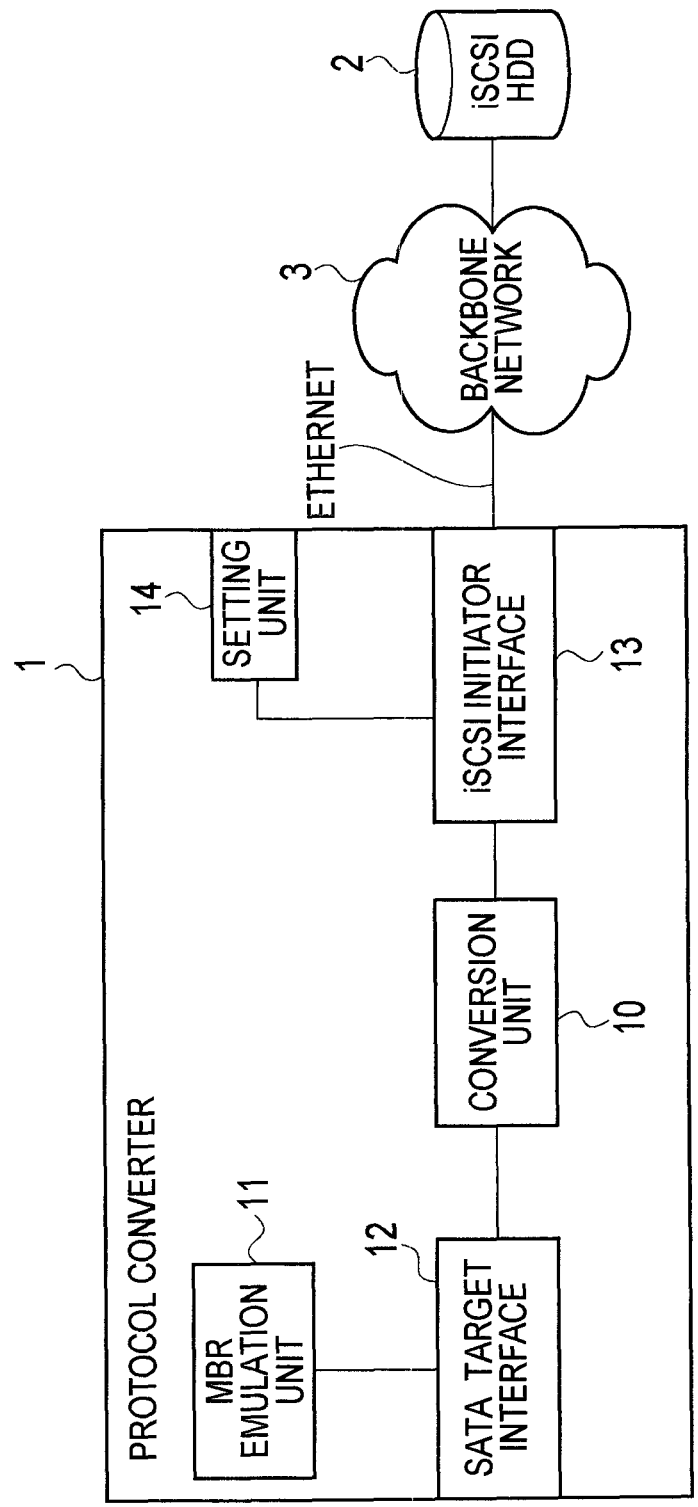
FIG. 2 is a functional block diagram of the protocol converter according to the first embodiment of the present invention.

To be more precise, as shown in FIG. 2, the protocol converter 1 according to this embodiment includes a conversion unit 10, a MBR (master boot record) emulation unit 11, a SATA (serial ATA) target interface 12, an iSCSI (Internet Small Computer System Interface) initiator interface 13, and a setting unit 14.

The conversion unit 10 is configured to perform conversion between an iSCSI protocol (a first protocol) to be used by the iSCSI initiator interface 13 (a first interface) and a SATA protocol (a second protocol) to be used by the SATA target interface 12 (a second interface).

Here, the first protocol may be a protocol other than the iSCSI protocol and the second protocol may be a protocol other than the SATA protocol.

Further, the conversion unit 10 is configured to convert an iSCSI protocol command received by the iSCSI initiator interface 13 into a SATA protocol command and to transmit the command to the SATA target interface 12.

On the other hand, the conversion unit 10 is configured to convert a SATA protocol command received by the SATA initiator interface 12 into an iSCSI protocol command and to transmit the command to the iSCSI initiator interface 13.

The MBR emulation unit 11 is configured to provide a master boot record (MBR) in response to a request from system BIOS (Basic Input/Output System).

The SATA target interface 12 is configured to emulate a function as a SATA target.

For example, the SATA target interface 12 is configured to provide a secondary boot loader with an OS (Operating System) acquired by the iSCSI initiator interface 13.

Here, when a function corresponding to a SATA protocol command from a SATA initiator is not supported by the protocol converter 1, the SATA target interface 12 is configured to execute predetermined response processing.

The iSCSI initiator interface 13 is configured to emulate a function as an iSCSI initiator.

For example, the iSCSI initiator interface 13 is configured to acquire the OS from an iSCSI HDD 2 (a remote hard disk drive) through a backbone network 3 in response to an OS acquisition request from the secondary boot loader.

Here, the iSCSI initiator interface 13 is configured to be able to respond to all commands from an iSCSI target.

The setting unit 14 is configured to perform setting of the iSCSI initiator interface 13.

Note that the protocol converter 1 according to this embodiment may be equipped with an encryption engine in order to realize high-speed encryption in the iSCSI protocol.

(Method for Activating OS in Computer System according to First Embodiment of Present Invention)

Figure 3:
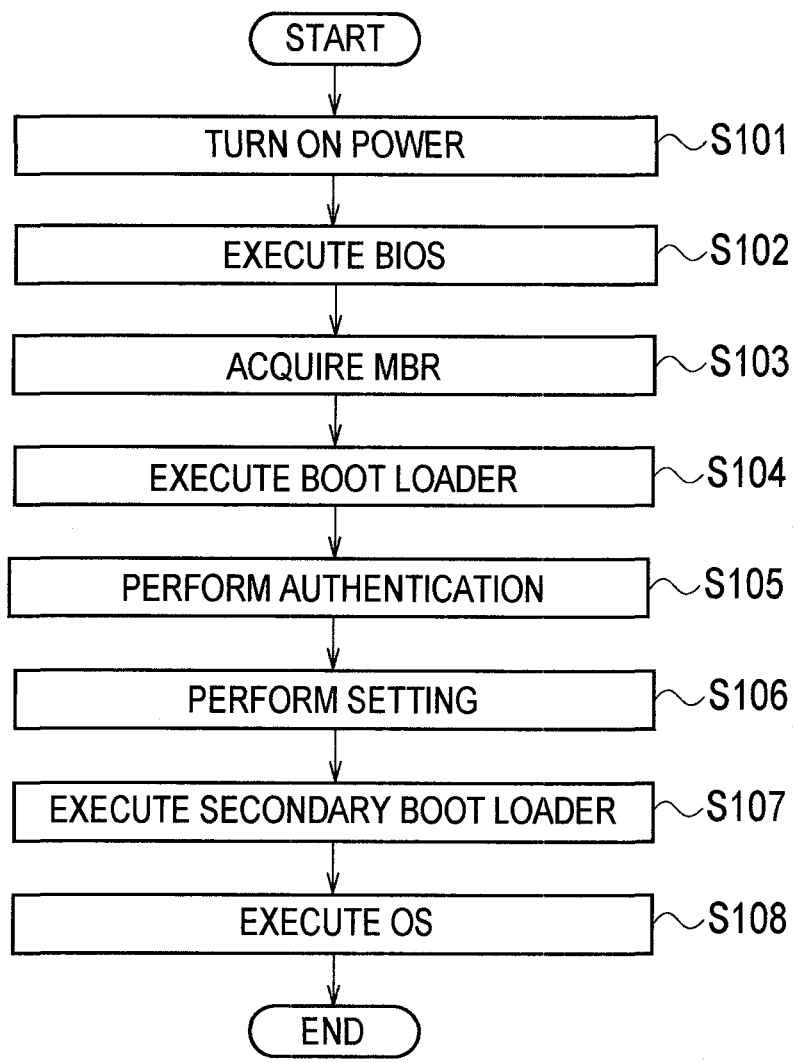
FIG. 3 is a flowchart showing an operation at the time of booting a computer equipped with the protocol converter according to the first embodiment of the present invention.

A method for activating an OS in a computer system according to the first embodiment of the present invention will be described with reference to FIG. 3 and FIG. 4.

When a user turns on the power of the computer system in step S101, the CPU 5 executes the system BIOS in step S102.

Here, the user performs setting of the iSCSI initiator interface 13 on a setting screen which is displayed as standard output of the system BIOS.

For example, the user sets up the iSCSI target (such as the iSCSI HDD 2), amount point of the iSCSI target, and the like by using the setting screen.

In step S103, the system BIOS selects an internal hard disk drive as initial program load (IPL) equipment.

Figure 4:
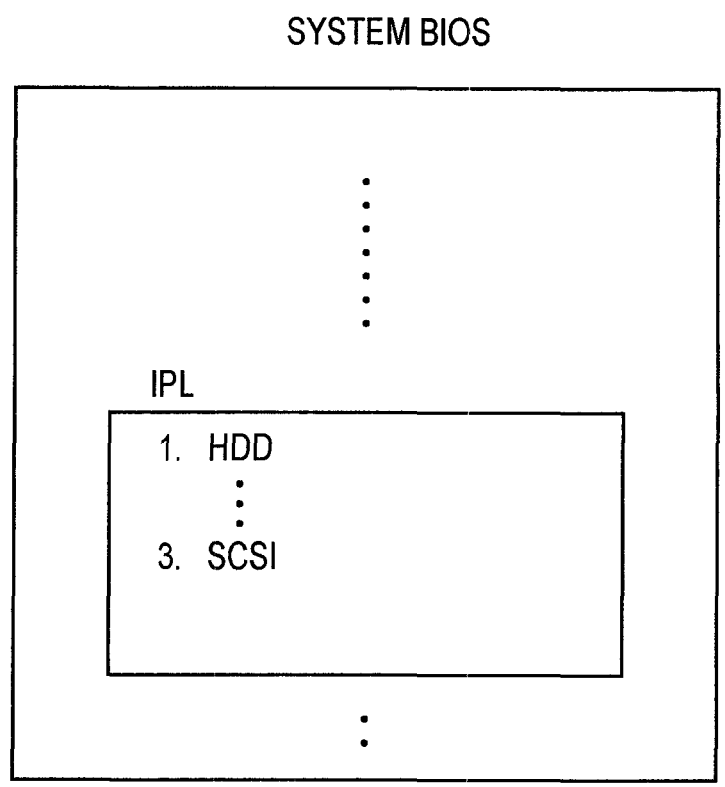
FIG. 4 is a view showing an example of system BIOS set up on the computer equipped with the protocol converter according to the first embodiment of the present invention.

Here, in this embodiment, priorities of drives to be selected as the initial program load equipment are assumed to be set up in the system BIOS as shown in FIG. 4.

Then, the system BIOS acquires the master boot record (MBR) from the protocol converter 1 which is connected to the ATA interface connector (the internal hard disk drive connector).

In step S104, the system BIOS reads a boot loader (a primary boot loader) into the memory 6 and executes the boot loader based on the master boot record.

Here, the boot loader may be recorded on the iSCSI HDD 2 and to be acquired by the protocol converter 1 through the backbone network 3.

The boot loader performs authentication processing required by the iSCSI protocol in step S105, and then performs setting required by the iSCSI protocol in step S106.

In step S105, the boot loader reads the secondary boot loader into the memory 6 and executes the secondary boot loader.

Here, the secondary boot loader may be recorded on the iSCSI HDD 2 and to be acquired by the protocol converter 1 through the backbone network 3.

In step S106, the second boot loader transmits the OS acquisition request to the protocol converter 1.

Then, the protocol converter 1 acquires the OS from the iSCSI HDD 2 (the remote hard disk drive) through the backbone network 3 based on the OS acquisition request received via the SATA target interface 12 and provides the second boot loader with the OS, whereby the secondary boot loader reads the OS provided by the protocol converter 1 into the memory 6 and executes the OS.

Here, the OS is recorded in a region specified by the mount point of the iSCSI HDD 2 set up by way of the above-described setting screen.

(Operations and Effects of Protocol Converter according to First Embodiment of Present Invention)

The protocol converter 1 according to the first embodiment of the present invention is configured to be connected to the ATA interface connector instead of the internal hard disk drive. Therefore, it is possible to construct a network booting structure without consuming one universal bus slot such as a PCI bus slot.

Moreover, according to the protocol converter 1 of the first embodiment of the present invention, it is possible to construct the network booting structure without using extended BIOS that may not be normally read by the system BIOS or using SCSI resources in the computer system which requires a driver.

While the foregoing embodiment describes an example of applying the protocol converter 1 according to the present invention to the computer system (the thin client system), the protocol converter 1 according to the present invention may also be used in a media server or a STB (Set Top Box), for example, instead of the computer system (the thin client system).

The present invention has been described above in detail by use of the embodiment. However, it is obvious to those skilled in the art that the present invention is not limited only to the embodiment described in this specification. The present invention can also be embodied in various modified and altered aspects without departing from the gist and scope of the invention as defined by the appended claims. It should therefore be understood that the description in this specification is intended for exemplary explanation but not for limiting any aspects of the invention.

The entire contents of Japanese Patent Application No. 2008-126096 (filed on May 13, 2008) are incorporated in this specification by reference.

As described above, a method for staring an OS and a protocol converter according to the present invention are capable of constructing a network booting structure by use of a universal PC and a server, without consuming one universal bus slot such as a PCI bus slot, and are therefore useful in an information processing system such as a computer system.

The invention claimed is:

1. A method for activating an OS in a computer system provided with a CPU and a memory, comprising the steps of:
   executing, at the CPU, a system BIOS when power is turned on;
   selecting, at the system BIOS, an initial program load;
   acquiring, at the system BIOS, a master boot record from a protocol converter;
   causing the system BIOS to read a boot loader into the memory and to execute the boot loader based on the master boot record;
   causing the boot loader to read a secondary boot loader into the memory and to execute the secondary boot loader;
   transmitting, an OS acquisition request, from the secondary boot loader of the memory to the protocol converter, via a Serial Advanced Technology Attachment (SATA) protocol;
   causing the protocol converter via an Internet Small Computer System Interface (iSCSI) protocol, to acquire an OS from a remote hard disk drive through a network based on the received OS acquisition request and to provide the secondary boot loader with the OS;
   causing the secondary boot loader to read the OS provided by the protocol converter into the memory and to execute the OS; and
   performing, at the protocol converter, protocol conversion between a first protocol to be used for communication with the remote hard disk drive and a second protocol to be used for communication with the memory.

2. A protocol converter to be used in a computer system provided with a Central Processing Unit (CPU) and a memory, the protocol converter comprising:
   a Master Boot Record (MBR) emulation unit configured to provide a master boot record in response to a request received from a system Basic Input/output System (BIOS);
   a Internet Small Computer System Interface (iSCSI) interface configured to acquire an Operating System (OS) from a remote hard disk drive through a network in response to an OS acquisition request from a secondary boot loader loaded into the memory;
   a Serial Advanced Technology Attachment (SATA) interface configured to provide the secondary boot loader with the OS acquired by the iSCSI interface; and
   a conversion unit configured to perform conversion between a first protocol to be used for communication with the remote hard disk drive and a second protocol to be used for communication with the memory.

* * * * *